UNITED STATES PATENT OFFICE.

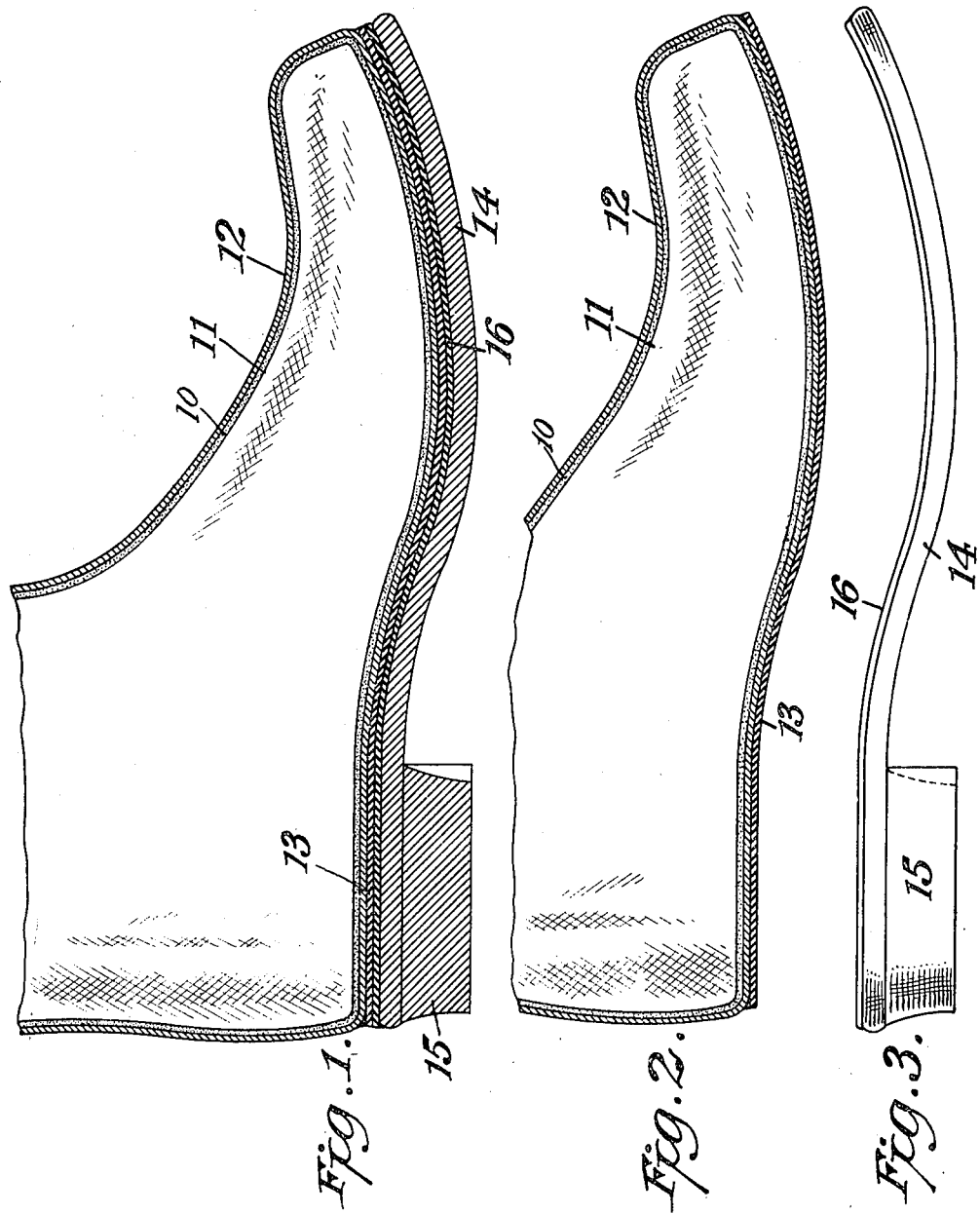

RAYMOND B. PRICE, OF NEW YORK, N. Y., ASSIGNOR TO RUBBER REGENERATING COMPANY, A CORPORATION OF INDIANA.

PROCESS OF MANUFACTURING RUBBER BOOTS.

1,206,914. Specification of Letters Patent. Patented Dec. 5, 1916.

Application filed April 24, 1915. Serial No. 23,574.

*To all whom it may concern:*

Be it known that I, RAYMOND B. PRICE, a citizen of the United States, and a resident of New York, county of New York, and State of New York, have invented certain new and useful Improvements in Processes of Manufacturing Rubber Boots, of which the following is a full, clear, and exact description.

This invention relates to rubber boots and shoes and more particularly to the process of manufacturing same.

The primary object of this invention is the devising of means whereby the finished boot or shoe will include a layer of rubber supporting and strengthening fabric or fibrous material, a vulcanized rubber cover extending over the entire outer surface of said continuous layer, and a sole and heel secured to said rubber cover. As a result of this construction, leakage into the interior of the boot will be prevented should the sole separate from the boot, as will hereinafter be more fully explained.

Figure 1 is a sectional view of a boot constructed in accordance with my invention; Fig. 2 is a fragmentary detail of the foot portion of the boot; Fig. 3 is an elevation of the sole and heel.

In carrying out the invention I form a layer 10 of fabric or fibrous material which in its primary state is preferably a continuous unit having a predetermined formation corresponding to the foot and leg portions of the boot, shoe or overshoe to be produced. This is drawn on a form 11, and may if desired be made slightly smaller so that it will fit snugly. When desired this layer may be provided with a slit or slits to facilitate its being drawn on to the form; also more than one layer of the material may be used.

A rubber cover 12 in an unvulcanized condition is disposed on the entire exterior of the unitary fibrous layer 10, and for a purpose which will be presently explained, is preferably equipped on the bottom with a layer of rubber 13, having no, or at least very little sulfur or other vulcanizing agent compounded therewith. Preferably, the article at this stage is vulcanized in the usual or any preferred manner, the sulfur contained in the rubber cover passing over into the contacting surface of the layer 13, sufficiently to unite the latter to the article, while the exposed bottom surface of the layer is substantially unaffected and retains approximately the adhesiveness of raw or green rubber.

The rubber sole 14 and heel 15 of the article are preferably vulcanized as a unit separately from the article, and the sole also is preferably provided on the top surface with a layer 16 of rubber containing no, or at least very little sulfur or other vulcanizing agent, which layer as has been explained above, is united to the sole by vulcanization, but retains approximately the adhesiveness of raw or green rubber at its top surface.

The process is completed by moistening the unvulcanized green or raw rubber surfaces of the layers 13 and 16 with sulfur chlorid and then pressing the moistened layers into intimate contact with each other. After a few moments of such pressure contact vulcanization and union of these surfaces will take place, whereby the sole is firmly united to the foot portion of the article, by vulcanized rubber.

By virtue of the rubber cover 12 extending over the entire outer surface of the unitary layer 10, the article will be impervious to leakage should the sole separate from the article under severe conditions of service.

What is claimed is:

The process of manufacturing rubber boots consisting of separately vulcanizing a rubber sole and a rubber upper while maintaining each in contact with a respective layer of rubber having approximately no sulfur or other vulcanizing agent, and subsequently uniting the parts by moistening said layers with sulfur chlorid and then pressing them together.

Signed at New York, county of New York, and State of New York, this 22d day of April, 1915.

RAYMOND B. PRICE.

Witnesses:
   C. M. SCHULE,
   D. HOWLETT.